(12) United States Patent
Murayama (10) Patent No.: US 6,425,598 B2
(45) Date of Patent: Jul. 30, 2002

(54) FOLDING BICYCLE

(76) Inventor: Katsuichi Murayama, 662-8, Nakahigano, Inasato-machi, Nagano-shi, Nagano 381-2215 (JP)

( * ) Notice: Subject to any disclaimer, the term of this patent is extended or adjusted under 35 U.S.C. 154(b) by 0 days.

(21) Appl. No.: 09/738,770

(22) Filed: Dec. 18, 2000

(30) Foreign Application Priority Data

Dec. 20, 1999 (JP) .......................................... 11-360872

(51) Int. Cl.$^7$ ............................................ B62M 15/00
(52) U.S. Cl. ........................ 280/278; 280/200; 280/261; 280/287
(58) Field of Search ................... 280/278, 287, 280/261

(56) References Cited

U.S. PATENT DOCUMENTS

| | | | | |
|---|---|---|---|---|
| 3,623,749 A | * | 11/1971 | Jensen | 280/278 |
| 3,990,717 A | * | 11/1976 | Best | 280/287 |
| 4,111,447 A | * | 9/1978 | Ishida | 280/278 |
| 4,182,522 A | * | 1/1980 | Ritchie | 280/278 |
| 4,422,663 A | * | 12/1983 | Hon | 280/278 |
| 4,448,437 A | * | 5/1984 | Montague | 280/287 |
| 4,844,494 A | * | 7/1989 | Blanchard | 280/278 |
| 5,351,979 A | * | 10/1994 | Langen | 280/278 |

FOREIGN PATENT DOCUMENTS

| | | | | |
|---|---|---|---|---|
| DK | 115460 | * | 12/1900 | .................. 280/287 |
| GB | 1580048 | | 11/1980 | |
| GB | 2248591 | | 4/1992 | |
| WO | 83/03232 | | 9/1983 | |
| WO | 87/01084 | * | 2/1987 | .................. 280/287 |
| WO | 94/23987 | * | 10/1994 | .................. 280/287 |
| WO | 99/51485 | | 10/1999 | |

\* cited by examiner

*Primary Examiner*—Daniel G. DePumpo
(74) *Attorney, Agent, or Firm*—Greenblum & Bernstein, P.L.C.

(57) ABSTRACT

A folding bicycle includes a folding mechanism that permits the folding bicycle in its extended state to be folded at an intermediate region between a front wheel and a rear wheel. The folding bicycle is folded by the folding mechanism such that the front wheel is brought to a position at one side of the rear wheel. An axle shift mechanism permits a axle of the rear wheel to be shifted to a position toward the intermediate region. A chain-holding mechanism holds a sprocket chain at a predetermined position when the axle is shifted to the position toward the intermediate region by the axle shift mechanism, to thereby release engagement between a rear wheel-side sprocket and the sprocket chain.

20 Claims, 10 Drawing Sheets

FOLDING BICYCLE

BACKGROUND OF THE INVENTION

1. Field of the Invention

This invention relates to a folding bicycle constructed in a manner foldable about a central portion of a body thereof.

2. Description of the Related Art

Figure 12:
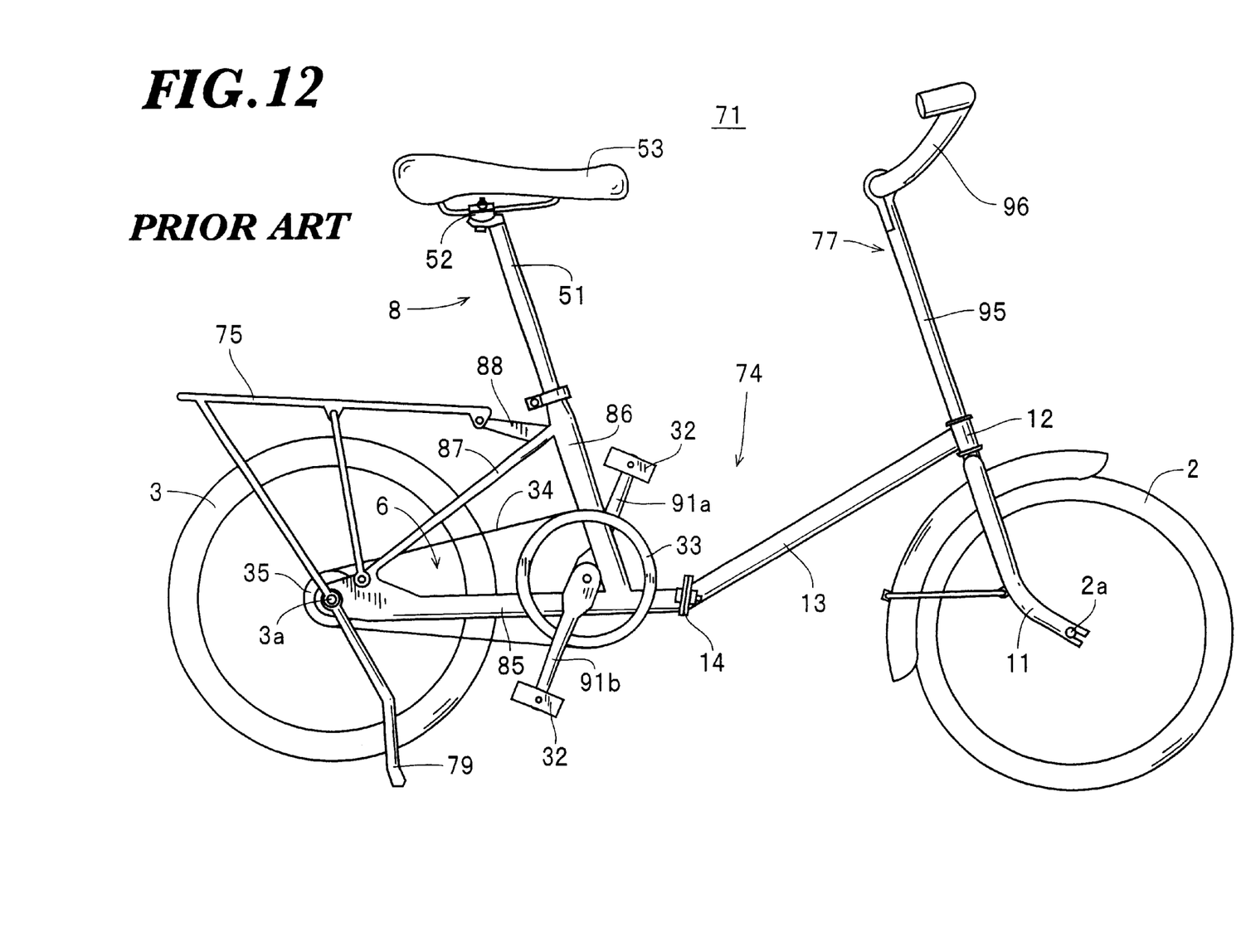
FIG. 12 is a side view of the bicycle 71 according to the related art.

A bicycle 71 shown in FIG. 12 is among folding bicycles of the above-mentioned type as the related art. The bicycle 71 includes a frame 74 rotatably supporting a front wheel 2 and a rear wheel 3, a drive mechanism 6 for driving the bicycle 71, a rack 75 secured above the rear wheel 3, a steering section 77 linked to the front wheel 2, a seat section 8 secured to a central portion of the frame 74, and a kick stand 79 that allows the bicycle 71 in its extended state to stand by itself and is capable of supporting the bicycle 71 in its folded state. The frame 74 is comprised of a front fork 11 connected to the steering section 77 and having the front wheel 2 secured thereto via an axle 2a, a steering head 12 holding the front fork 11 and the steering section 77 in a rotatable manner, a down tube 13, a folding mechanism 14 for folding the bicycle 71, a rear arm 85 connected to the down tube 13 via the folding mechanism 14 and having the rear wheel 3 secured thereto via an axle 3a, a seat tube 86 extending upward from the rear arm 85, for having the seat section 8 secured thereto such that the seat section 8 can be moved vertically, a seat stay 87 connecting between the rear end portion of the rear arm 85 and the upper end portion of the seat tube 86, and a stay 88 having the rack 75 secured thereto.

The drive mechanism 6 includes a pedal-side sprocket 33 to which are attached pedals 32, 32 via respective cranks 91a, 91b, and a rear wheel-side sprocket 35 which is rotated via a sprocket chain 34 as the pedal-side sprocket 33 rotates. The steering section 77 is comprised of a stem 95 connected to an upper end of the front fork 11 within the steering head 12 and a handle bar 96 secured to the upper end of the stem 95. Further, the seat section 8 is comprised of a seat post 51 secured to the seat tube 86 such that the seat post 51 can be moved vertically therein, and a saddle 53 secured to the upper end of the seat post 51 via a saddle angle-adjusting mechanism 52.

Figure 13:
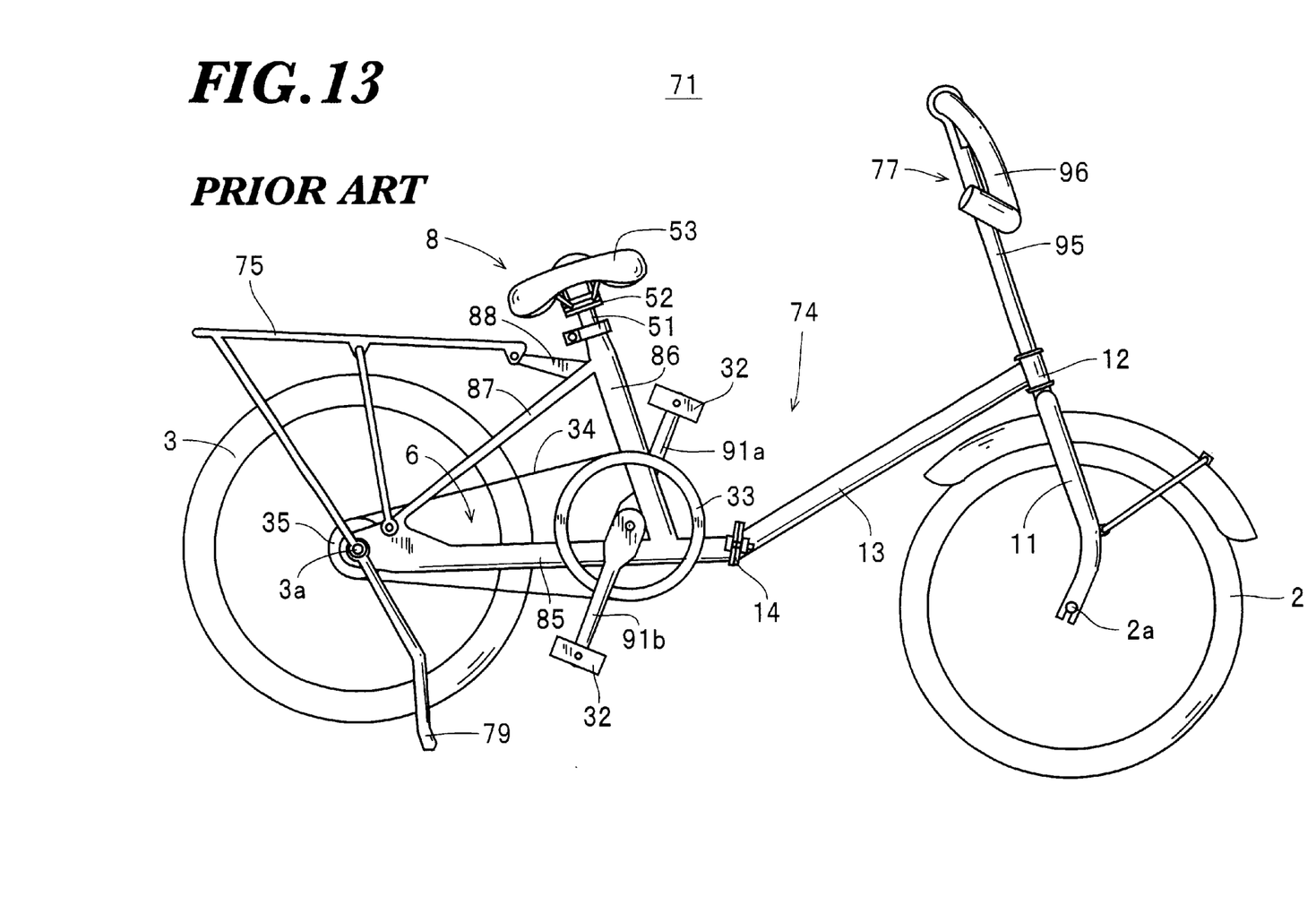
FIG. 13 is a side view of the bicycle 71 which has not yet been folded by a folding mechanism 14.
Figure 14:
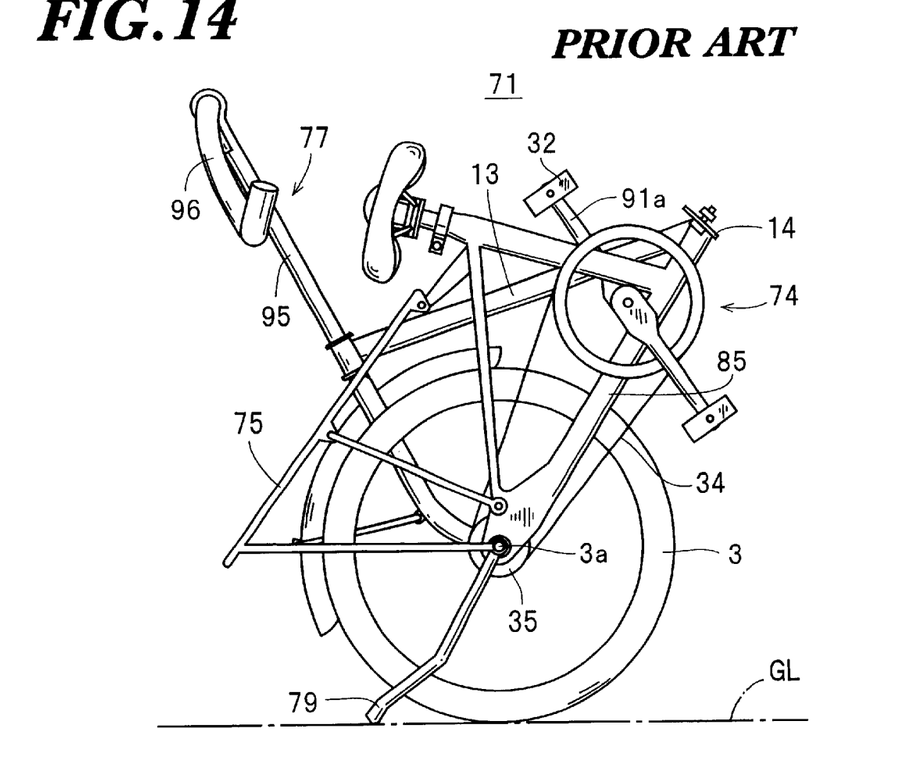
FIG. 14 is a side view of the bicycle 71 in its folded state.

The bicycle 71 is folded through the following procedure. First, as shown in FIG. 13, the seat post 51 is pushed down into the seat tube 86 such that it is received therein. Then, after the handle bar 96 is turned downward to a position where each of the opposite ends thereof looks as if suspended from the upper end of the stem 95, the steering section 77 in this state and the front fork 11 having the front wheel 2 secured thereto are turned around. At this time, the front wheel 2 is shifted toward the folding mechanism 14 by a distance which is twice longer than a front fork offset. Subsequently, the bicycle 71 in this state is folded by and about the folding mechanism 14 at the central portion of the bicycle 71. As a result, the front wheel 2 is positioned at the left side of the rear wheel 3 (as viewed from the rear of the bicycle 71), whereby the length of the bicycle 71 is reduced approximately by half in comparison with the whole length of the bicycle 71 in its extended state. Thereafter, by placing the front and rear wheels 2, 3 and the kick stand 79 on the ground, with the kick stand 79 kicked backward as shown in FIG. 14, the bicycle 71 in its folded state stands in a state supported by the front and rear wheels 2, 3 and the kick stand 79.

However, the above bicycle 71 suffers from the following problems: As described above, the bicycle 71 is folded by and about the folding mechanism 14 at the central portion of the bicycle 71, so that the length of the bicycle 71 is reduced approximately by half in comparison with the whole length of the bicycle 71 in its extended state. However, the distance from the axle 2a to the folding mechanism 14 and the distance from the axle 3a to the folding mechanism 14 are each longer than the radius of the front wheel 2 and that of the rear wheel 3, and hence the down tube 13 and the rear arm 85 project considerably far from the front and rear wheels 2, 3 in the folded state of the bicycle 71. If the distance between the two axles 2a, 3a is reduced so as to solve the above problem by reducing the distances between the respective axles 2a 3a and the folding mechanism 14, running stability of the bicycle 71 is degraded due to the reduction of the distance between the axles 2a, 3a. Since it is thus difficult to reduce the distance from the axles 2a, 3a of the respective wheels 2, 3 to the folding mechanism 14 in the folded state while maintaining the running stability of the bicycle 71 in the extended state, reduction of the size of the bicycle 71 in its folded state (hereinafter also referred to as "the folded bicycle 71") is difficult.

Another problem occurs with the folded bicycle 71 when it is carried. If a user tries to move the folded bicycle 71 by rotating the wheels 2, 3 on the ground, rotation of the rear wheel 3 causes rotation of the rear wheel-side sprocket 35, whereby the pedal-side sprocket 33 is rotated via the sprocket chain 34. As a result, the pedal 32 attached to the crank 91a is brought into abutment with the front wheel 2 or the down tube 13. This abutment inhibits the rotation of the rear wheel-side sprocket 35, and hence it becomes impossible to rotate the rear wheel 3. Consequently, the user has to carry the folded bicycle 71 e.g. by holding the seat tube 86 by hand and lifting the whole bicycle 71.

Still another problem is as follows: In the bicycle 71, the handle bar 96 is turned with respect to the stem 95 for reduction of the size of the bicycle 71 in its folded state. However, even when the handle bar 96 is turned downward, the length from the steering head 12 to the upper end of the stem 95 is not reduced, and, what is more, the opposite ends of the handle bar 96 largely project leftward and rightward, respectively, from the folded bicycle 71. This also makes it difficult to reduce the size of the bicycle 71 in its folded state. Further, the pedals 32, 32 also largely project leftward and rightward, respectively, from the folded bicycle 71, which also makes it difficult to reduce the size of the folded bicycle 71.

Figure 15:
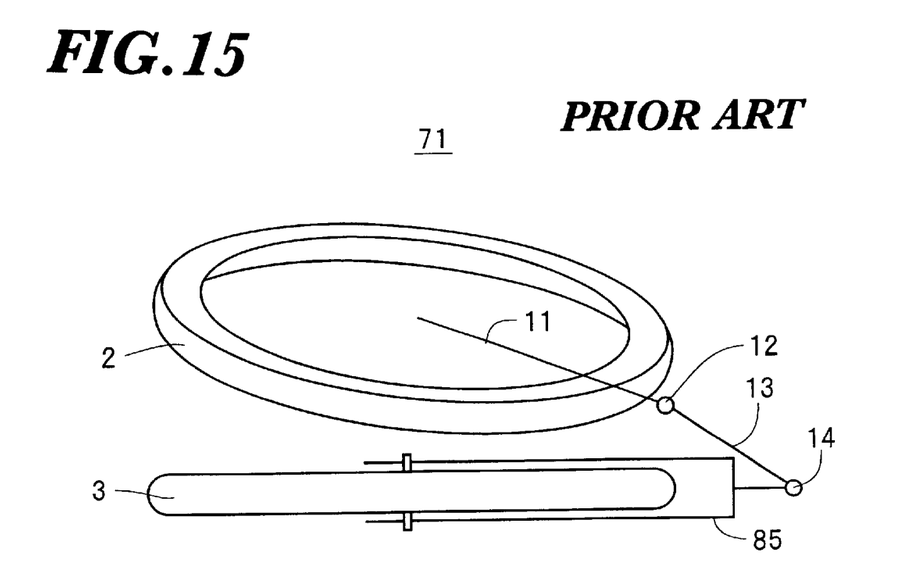
FIG. 15 is a conceptual representation of the bicycle 71 in the FIG. 14 state as viewed from above, which is useful in explaining positions of a front view 2 and a rear wheel 3.

Moreover, as shown in FIG. 15, when the bicycle 71 is folded, the front wheel 2 and the rear wheel 3 are not in a state held in parallel with each other. Therefore, in moving forward or backward the folded bicycle 71 with the wheels 2, 3 placed on the ground, once the parallelism of the front and rear wheels 2, 3 is lost, the state of the two wheels more pronouncedly tends to go further away from parallelism. For this reason, when the user tries to move the folded bicycle 71 straight in the direction of reverse rotation of the rear wheel 3 e.g. by pushing the seat tube 86, the resistance to rotation of the front wheel 2 is increased, which makes it difficult to carry the bicycle 71 in a state of the wheels 2, 3 being on the ground.

In addition, there is another problem that when the bicycle 71 is folded, the user has to carry baggage which was placed on the rack 75 during running of the bicycle 71, apart from the bicycle 71. More specifically, in the state of the bicycle 71 being folded, the rack 75 is inclined at a large angle with respect to the ground GL as shown in FIG. 14, so that if the baggage is left on the rack 75, the baggage can fall off the rack 75 due to its own weight. Therefore, it is hard to carry the bicycle 71 with the baggage placed on the rack 75, and hence the user has to carry the bicycle 71 by one hand while carrying the baggage by the other hand, which is very troublesome and laborious.

SUMMARY OF THE INVENTION

It is an object of the invention to provide a folding bicycle that is reduced in size in its folded state while maintaining the running stability in its extended state and easy to carry in its folded state.

It is another object of the invention to provide a folding bicycle that can be carried with baggage loaded thereon.

To attain the above objects, the present invention provides a folding bicycle including a front wheel, a rear wheel having an axle, a rear wheel-side sprocket connected to the rear wheel, a sprocket chain for being engaged with the rear wheel-side sprocket, and a folding mechanism permitting the folding bicycle in an extended state to be folded at an intermediate region between the front wheel and the rear wheel, wherein the folding bicycle is folded by the folding mechanism such that the front wheel is brought to a position at one side of the rear wheel.

The folding bicycle according to the invention is characterized by comprising an axle shift mechanism permitting the axle of the rear wheel to be shifted to a position toward the intermediate region, and a chain-holding mechanism that holds the sprocket chain at a predetermined position when the axle is shifted to the position toward the intermediate region by the axle shift mechanism, to thereby release engagement between the rear wheel-side sprocket and the sprocket chain.

According to this folding bicycle, since the bicycle is provided with the axle shift mechanism that permits an axle of the rear wheel to be shifted toward the intermediate region, it is possible to increase the distance between the two axles in the extended state of the bicycle, thereby securing the running stability of the bicycle, and at the same time it is possible to reduce the distance between the two axles in the folded state of the bicycle, thereby reducing the size of the folded bicycle. Further, in the folded state of the bicycle, the chain-holding mechanism holds the sprocket chain at the predetermined position when the axle is shifted toward the intermediate region by the axle shift mechanism, thereby releasing engagement between the rear wheel-side sprocket and the sprocket chain, so that it is possible to prevent the rear wheel-side sprocket from being rotated with rotation of the rear wheel, thereby allowing the folding bicycle to be moved by rotation of the wheels.

Preferably, the folding bicycle includes a front wheel-securing mechanism that rotatably secures the front wheel in a folded state of the folding bicycle, such that lines of intersection where a plane of rotation of the front wheel defined as an imaginary geometrical plane which contains a diameter of the front wheel and to which a rotational axis of the front wheel is perpendicular, and a plane of rotation of the rear wheel defined as an imaginary geometrical plane which contains a diameter of the rear wheel and to which a rotational axis of the rear wheel is perpendicular intersect with a ground plane defined as an imaginary geometrical plane corresponding to an arbitrary surface on which the front wheel and the rear wheel are supported are substantially parallel to each other.

According to this preferred embodiment, the front wheel-securing mechanism rotatably secures the front wheel in the folded state of the bicycle, such that lines of intersection where planes of rotation of the respective front and rear wheels intersect with the ground plane are substantially parallel to each other, so that when the folding bicycle in the folded state is moved by rotation of the wheels, the front and rear wheels rotate smoothly, thereby making it easy to move the folding bicycle.

Preferably, the folding bicycle includes an auxiliary wheel arranged in the vicinity of the folding mechanism such that the auxiliary wheel can be placed on a ground together with the front wheel and the rear wheel in the folded state of the folding bicycle, a rack arranged above the rear wheel, and a rack retainer mechanism that holds the rack generally horizontal with respect to a ground plane on which the front and rear wheels are placed, both in the extended state and in a folded state of the folding bicycle.

According to this preferred embodiment, by holding the rack horizontal by means of the rack retainer mechanism, it is possible to move the bicycle in the folded state with baggage placed on the rack by rotation of the front and rear wheels and the auxiliary wheel. Thus, the bicycle in the folded state can be used as a cart.

Preferably, the folding bicycle includes a kick stand arranged in the vicinity of the folding mechanism such that the kick stand can support the folding bicycle in a folded state thereof when the kick stand is in a predetermined position, and a seat post, and when the front wheel, the rear wheel, and the kick stand are placed on a ground in the folded state of the folding bicycle, the seat post is generally perpendicular to a plane of the ground.

According to this preferred embodiment, when the bicycle in the folded state is supported by the kick stand, the seat post is generally perpendicular to the ground plane, so that simply by adjusting a saddle such that it is held in a horizontal position with respect to the ground plane, it is possible to use the folded bicycle as a chair.

Preferably, the folding bicycle includes a pair of pedals, a pair of pedal cranks connected to the pedals, respectively, one of the pair of pedals projecting from a corresponding one of the pair of pedal cranks in a direction away from the one side of the rear wheel in a folded state of the folding bicycle, and a crank-turning mechanism that permits the one of the pair of pedal cranks to be turned in a manner such that the one of the pair of pedals projects toward the one side of the rear wheel.

According to this preferred embodiment, the crank-turning mechanism makes it possible to turn one of the pedal cranks such that the left and right pedals project in the same direction. Therefore, it is possible to reduce the width of the bicycle in the folded state, whereby the size of the folding bicycle can be further reduced in its folded state.

Preferably, the folding bicycle includes a handle system having a telescopic column portion, and an extended portion connected to an upper end of the telescopic column portion such that the extended portion can be fixed at a desired stem angle and that the extended portion can be rotated about an axis extending in a direction of extension of the extended portion.

According to this preferred embodiment, the bicycle is provided with the telescopically and rotatable handle system. Therefore, it is possible to make the bicycle in its folded state more compact, whereby the size of the folding bicycle can be reduced in its folded state.

BRIEF DESCRIPTION OF THE DRAWINGS

These and other objects and features of the present invention will be explained in more detail below with reference to the attached drawings, wherein.

DESCRIPTION OF THE PREFERRED EMBODIMENT

The invention will now be described in detail with reference to drawings showing a preferred embodiment thereof. In the following description of a folding bicycle according to the preferred embodiment, component parts and elements similar to those of the bicycle 71 according to the related art described hereinbefore are designated by identical reference numerals, and detailed description thereof is omitted.

Figure 1:
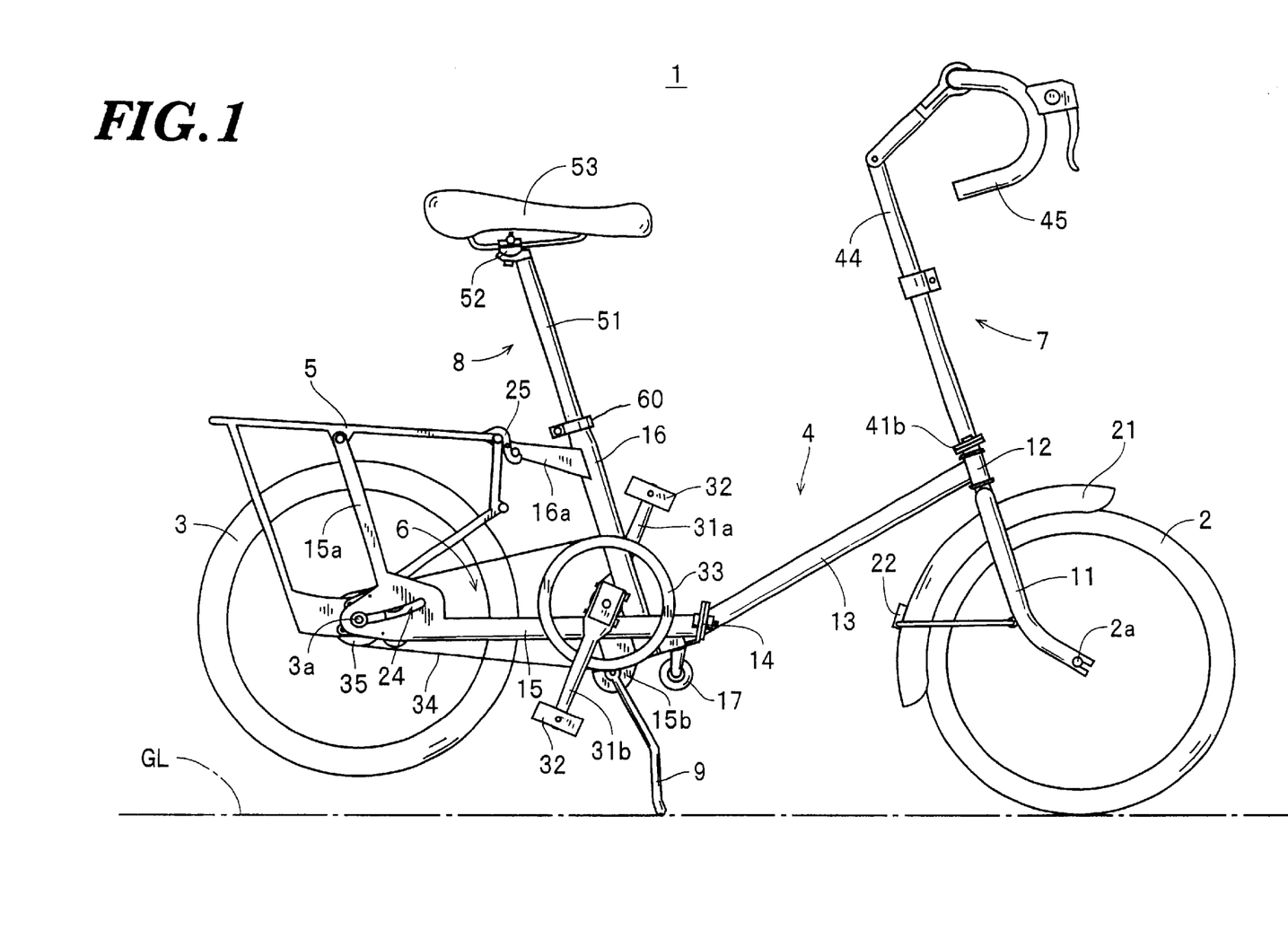
FIG. 1 is side view of a bicycle 1 according to an embodiment of the present invention.

Referring first to FIG. 1, there is shown the folding bicycle 1 which is comprised of a front wheel 2, a rear wheel 3, a frame 4, a rack 5, a drive mechanism 6, a steering section 7, a seat section 8, and a kick stand 9. The front wheel 2 and the rear wheel 3 are secured to the frame 4 via respective axles 2a, 3a of a so-called quick release type which can be easily mounted to and removed from the frame 4. The frame 4 is comprised of a front fork 11, a steering head 12, a down tube 13, a folding mechanism 14, a rear arm 15, and a seat tube 16. The front fork 11 has the front wheel 2 secured thereto via the axle 2a and has an upper end thereof connected to the steering section 7. Further, the front fork 11 has a fender 21 secured thereto. Attached to the fender 21 is a locking mechanism 22 corresponding to a front wheel-securing mechanism of the invention. The locking mechanism 22 is brought into engagement with the rack 5 when the bicycle 1 is folded, to thereby rotatably secure the front wheel 2 to a side of the rear wheel 3, such that lines of intersection where planes of rotation of the respective front and rear wheels 2, 3 intersect with a ground plane are substantially parallel to each other. The plane of rotation of a wheel is defined as an imaginary geometrical plane which contains the diameter of the wheel and to which the rotational axis of the wheel is perpendicular, and the ground plane as an imaginary geometrical plane corresponding to an arbitrary surface on which wheels are supported. The steering head 12 is fixedly attached to one end of the down tube 13, for rotatably supporting the front fork 11 and the steering section 7. The folding mechanism 14 foldably connects the down tube 13 and the rear arm 15 to each other.

The rear arm 15 is formed to have a V shape as viewed from above. The seat tube 16 has a lower end portion thereof fixed to a narrow-width portion of the rear arm 15 in a manner sandwiched by the forks of the rear arm 15, while the rear wheel 3 is fitted in a wide-width portion of the rear arm 15 via the axle 3a. The rear arm 15 is formed with a pair of slits 24 (through the respective forks) for receiving the rear axle 3a therethrough. The slits 24 allow the rear axle 3a to be shifted from a position shown in FIG. 2A, where it is fixed during running of the bicycle 1, to a position shown in FIG. 2B, where it is fixed when the bicycle 1 is folded. In this embodiment, the slits 24 and the axle 3a form an axle shift mechanism of the invention. Further, as shown in FIG. 1, the rear arm 15 is integrally formed with a pair of stays 15a each extending upward from above a corresponding one of the slits 24, for supporting the rack 5 in a pivotally movable manner, and the seat tube 16 has a stay 15b joined to a lower end thereof in a manner projecting downward, for having the kick stand 9 attached thereto. Further, mounted to a lower portion of the rear arm 15 close to the folding mechanism 14 is an auxiliary wheel 17. The seat tube 16 has a stay 16a joined thereto for having the rack 5 connected to the stay 16a, and a metal fixture 60 mounted thereto for fixing the seat section 8, and is fixedly secured to the rear arm 15, as described above. As shown in FIG. 3, the stay 16a has an end portion to which is attached a metal hook 25 corresponding to a rack retainer mechanism of the invention. The metal hook 25 is bolted to the stay 16a in a manner pivotally movable about a pivot 25a. The metal hook 25 cooperates with the stay 16a to maintain the rack 5 in a generally horizontal position with respect to the ground plane on which the front and rear wheels 2, 3 are placed, both in the extended state of the bicycle 1 and in the folded state of the same.

Figure 2A:
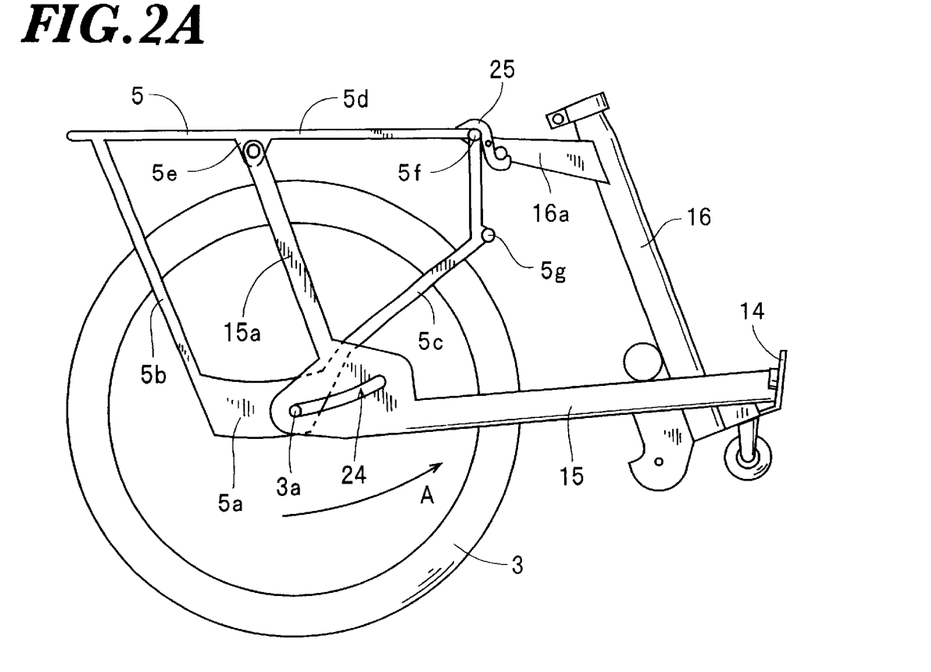
FIG. 2A is a side view showing a rear wheel 3 and its neighboring components of the bicycle 1 in its extended state.
Figure 2B:
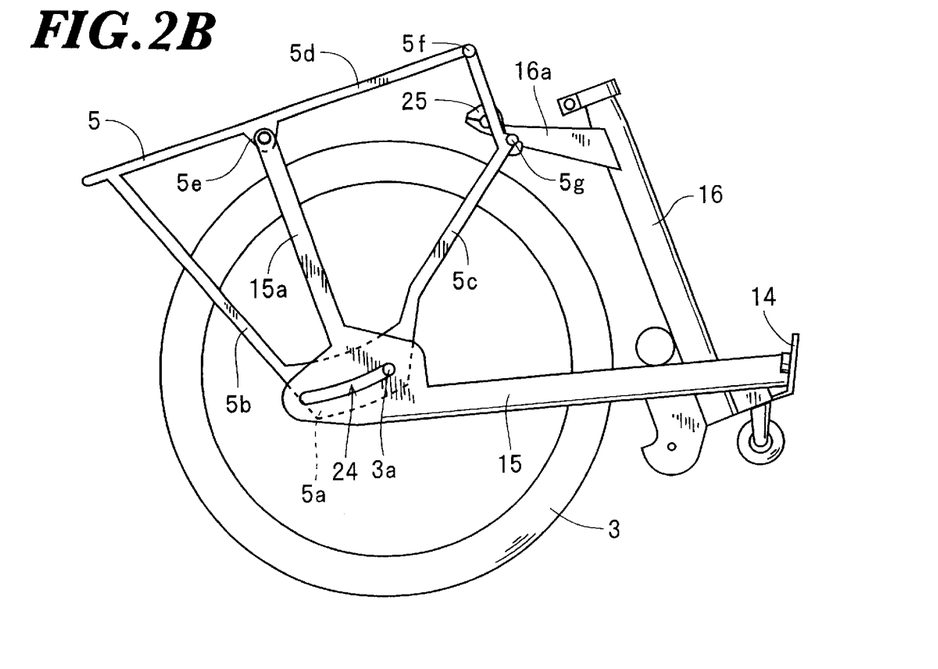
FIG. 2B is a side view showing the rear wheel 3 and its neighboring components of the bicycle 1 in its folded state.
Figure 3:
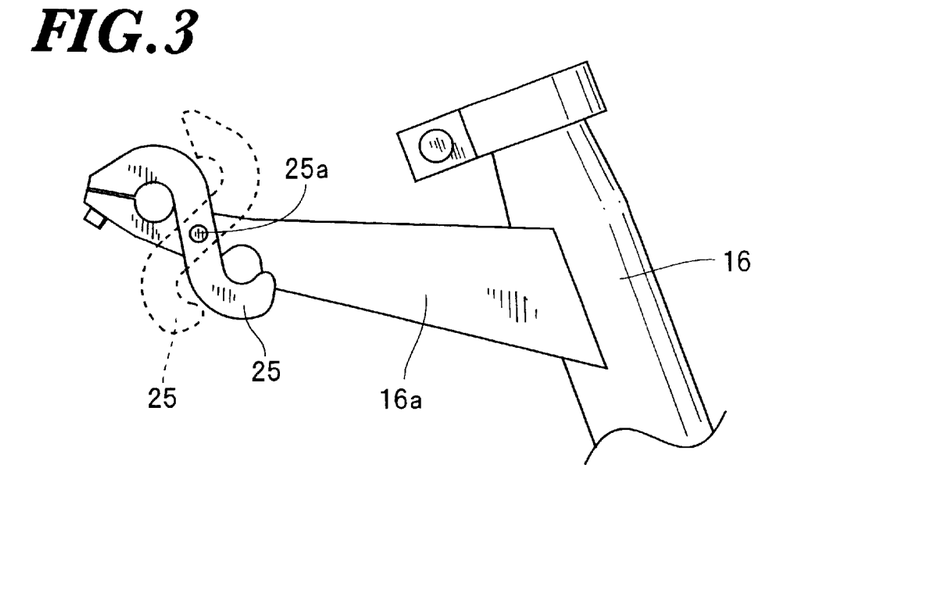
FIG. 3 is an enlarged view of a stay 16a and a metal hook 25.

As shown in FIGS. 2A, 2B, the rack 5 is comprised of plates 5a located at the respective opposite sides of the rear wheel 3 and formed with through holes, respectively, through which the axle 3a extends, a carrier portion 5d secured to the plates 5a via pairs of stays 5b, 5c, connecting portions 5e for connecting the rack 5 to the stays 15a of the rear arm 15 in a rotatable manner, and crossbars 5f, 5g each having opposite ends thereof secured to the respective stays 5c, for supporting the rack 5 in a state caught between the stay 16a of the seat tube 16 and the metal hook 25. When the crossbar 5f is caught between the stay 16a and the metal hook 25 as shown in FIG. 2A, the axle 3a is shifted to the rear ends of the respective slits 24 of the rear arm 15. As a result, the distance between the axle 3a and the folding mechanism 14, i.e. the distance between the axles 2a and 3a, is elongated, whereby the running stability of the bicycle 1 is maintained. On the other hand, when the rack 5 is rotated about the connecting portions 5e in the direction indicated by an arrow A in FIG. 2A until the crossbar 5g is caught between the stay 16a and the metal hook 25 as shown in FIG. 2B, the axle 3a is shifted to the front ends of the respective slits 24. As a result, the distance between the axle 3a and the folding mechanism 14 is shortened, whereby the total length of the bicycle 1 in the folded state is reduced. Further, in the bicycle 1, in the state of the crossbar 5f or 5g being caught between the stay 16a and the metal hook 25 as shown in FIG. 2A or 2B, the stay 5c functions similarly to the seat stay 87 of the frame 74 of the bicycle 71.

Figure 4A:
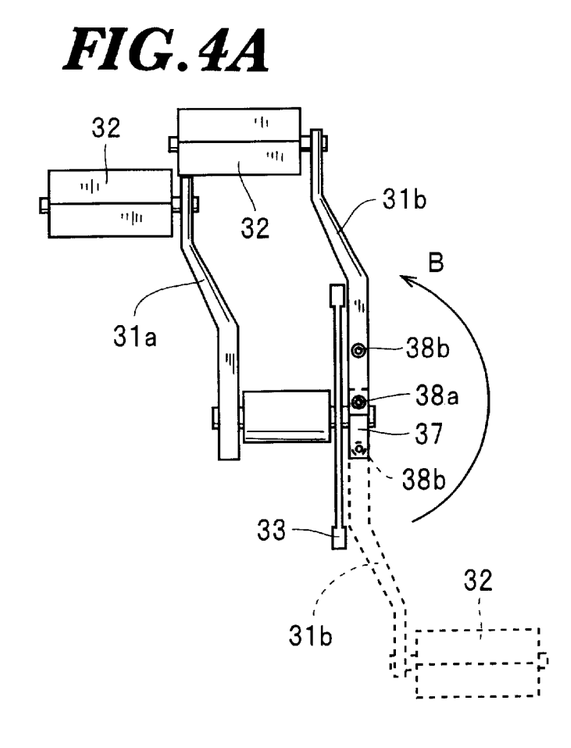
FIG. 4A is a rear view showing cranks 31a, 31b and a pedal-side sprocket 33 as viewed from the rear side.
Figure 4B:
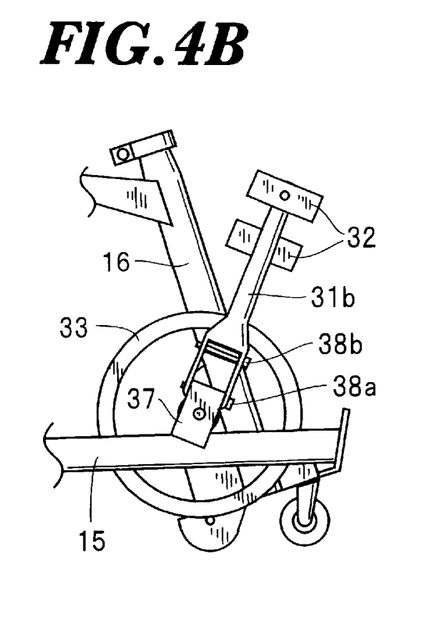
FIG. 4B is a side view showing cranks 31a, 31b and a pedal-side sprocket 33 as viewed from a right side.

As shown in FIG. 1, the drive mechanism 6 is comprised of cranks 31a, 31b arranged on the respective left and right sides of the bicycle 1 and having pedals 32 attached to respective ends thereof, a pedal-side sprocket 33 having the cranks 31a, 31b connected thereto, and a rear wheel-side sprocket 35 connected to the rear wheel 3, for being driven for rotation via the sprocket chain 34. The rear wheel-side sprocket 35 is secured to the rear wheel 3 by a so-called free mechanism for transmitting only torque applied via the sprocket chain 34 to drive the bicycle 1 forward, to the rear wheel 3. As shown in FIGS. 4A, 4B, the crank 31b is connected to the pedal-side sprocket 33 in a state fixed to a base member 37 by fixing bolts 38a, 38b. In the present embodiment, the crank 31b, the fixing bolts 38a, 38b and the base member 37 cooperatively constitute a crank-folding mechanism of the invention. When the bicycle 1 is extended, the crank 31b is shifted to a position indicated by dotted lines in FIG. 4A. On the other hand, in folding the bicycle 1, the crank 31b is pivotally moved about the fixing bolt 38a in the direction indicated by an arrow B in the figure. In this state, the pedal 32 attached to the crank 31a and the pedal 32 attached to the crank 31b project in the same direction, whereby the size of the bicycle 1 in its folded state (hereinafter also referred to as "the folded bicycle 1") is reduced.

Figure 5A:
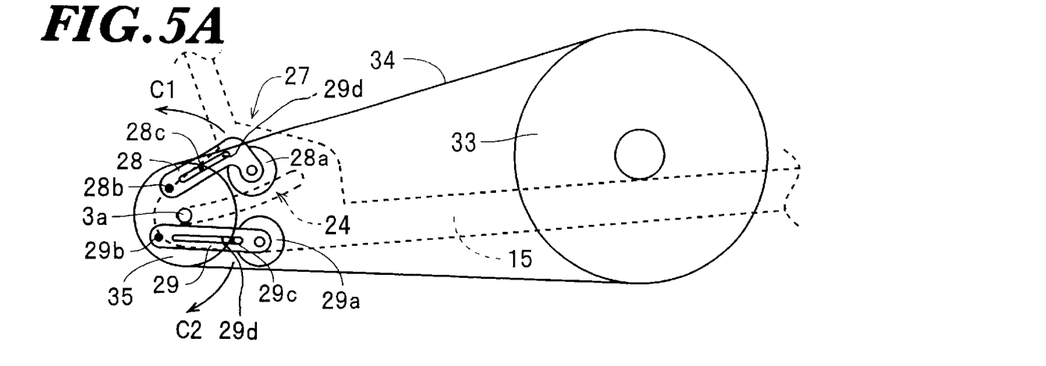
FIG. 5A is a side view showing a state of a chain-holding mechanism 27 before shifting of the rear wheel 3, which is useful in explaining operating principles of the chain-holding mechanism 27.
Figure 5B:
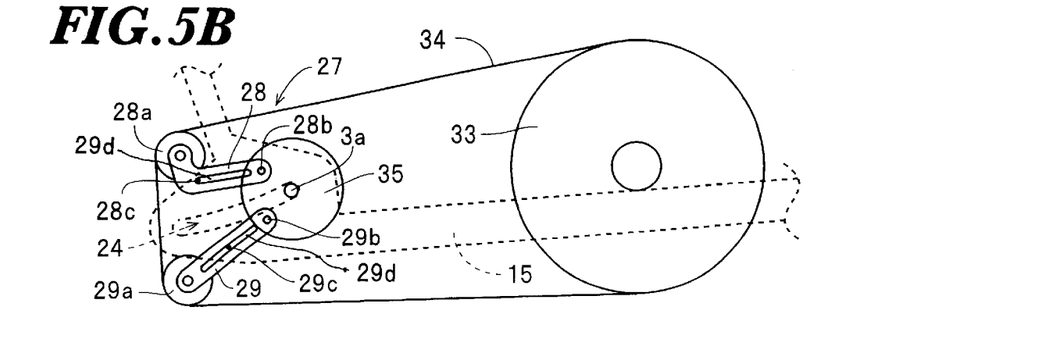
FIG. 5B is a side view showing a state of the chain-holding mechanism 27 after shifting of the rear wheel 3, which is useful in explaining the operating principles of the chain-holding mechanism 27.

As shown in FIGS. 5A, 5B, arranged in the vicinity of the rear wheel-side sprocket 35 is a chain-holding mechanism 27 for releasing engagement between the rear wheel-side sprocket 35 and the sprocket chain 34 by holding the sprocket chain 34 at a predetermined position when the bicycle 1 is folded. The chain-holding mechanism 27 includes an arm 28 which has a pulley 28a attached to an end thereof and is connected to one of the plates 5a of the rack 5 in a manner pivotally movable about a pivot 28b, and an arm 29 which has a pulley 29a attached to an end thereof and is connected to the one of the plates 5a in a manner pivotally movable about a pivot 29b. In the chain-holding mechanism 27, when the axle 3a is shifted to the rear ends of the slits 24 as shown in 5A, the pulleys 28a, 29a are positioned away from the sprocket chain 34. On the other hand, when the axle 3a is shifted to the front ends of the slits 24, the arms 28, 29 are guided by respective pins 28c, 29c fixed to the rear arm 15 and loosely fitted through grooves 28d, 29d formed in the arms 28, 29, respectively, such that the arms 28, 29 are pivotally moved above the respective pivots 28b, 29b in directions indicated by arrows C1, C2 in FIG. 5A, respectively. As a result, as shown in FIG. 5B, the rear wheel-side sprocket 35 shifted together with the axle 3a is disengaged from the sprocket chain 34 by the pulleys 28a, 28b brought into engagement with the sprocket chain 34 by the above motion, and the sprocket chain 34 is held in engagement with the pulleys 28a, 29a and the pedal-side sprocket 33.

Figure 6A:
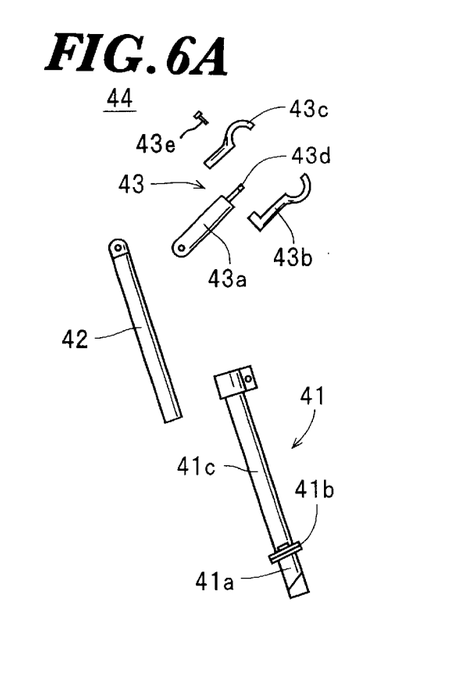
FIG. 6A is an exploded perspective view of a steering section 7.
Figure 6B:
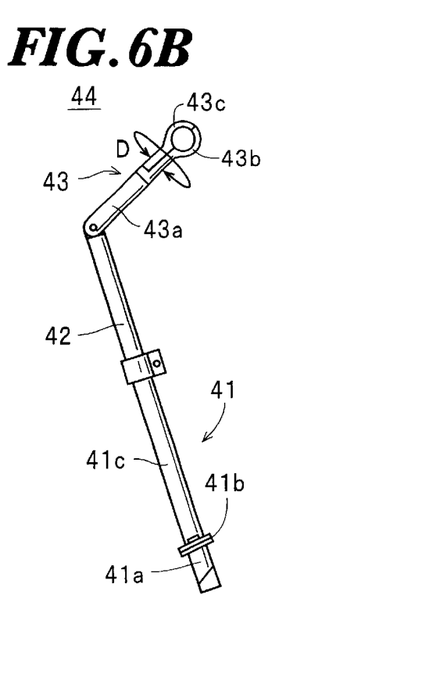
FIG. 6B is a side view of the steering section 7.

Referring again to FIG. 1, the steering section 7 is comprised of a stem 44 having its lower end connected to the front fork 11 within the steering head 12 and a drop bar-type handle bar 45 secured to the stem 44. As shown in FIG. 6A, the stem 44 is comprised of an undertube 41, an upper post 42, and an extension beam 43. The undertube 41, which cooperates with the upper post 42 to form a column portion of the invention, is comprised of pipes 41a, 41c connected to each other via a folding mechanism 41b. The upper post 42 is held by the undertube 41 in a vertically movable manner. The extension beam 43 corresponding to an extended portion of the invention is secured to the upper post 42 such that the stem angle of the extension beam 43 with respect to the upper post 42 can be set as desired. The extension beam 43 is comprised of a base portion 43a, a lower metal retainer 43b, an upper metal retainer 43c, and a shaft 43d extending from the base portion 43a. The upper metal retainer 43c is bolted to the lower metal retainer 43b, whereby the handle bar 45 is fixedly held between the two metal retainers 43b, 43c. The extension beam 43 is constructed, as shown in FIG. 6B, such that when a fixing bolt 43e for tightening the lower and upper metal retainers 43b, 43c is loosened, the two metal retainers 43b, 43c can be rotated about the axis of the base portion 43a in directions indicated by a double-headed arrow D in the figure, and in this state the handle bar 45 is held between the two metal retainers 43b, 43c such that the handle bar 45 can be rotated about the shaft 43d.

Next, the method of using the bicycle 1 will be described with reference to FIGS. 1, 6B, and 7 to 11.

Figure 8:
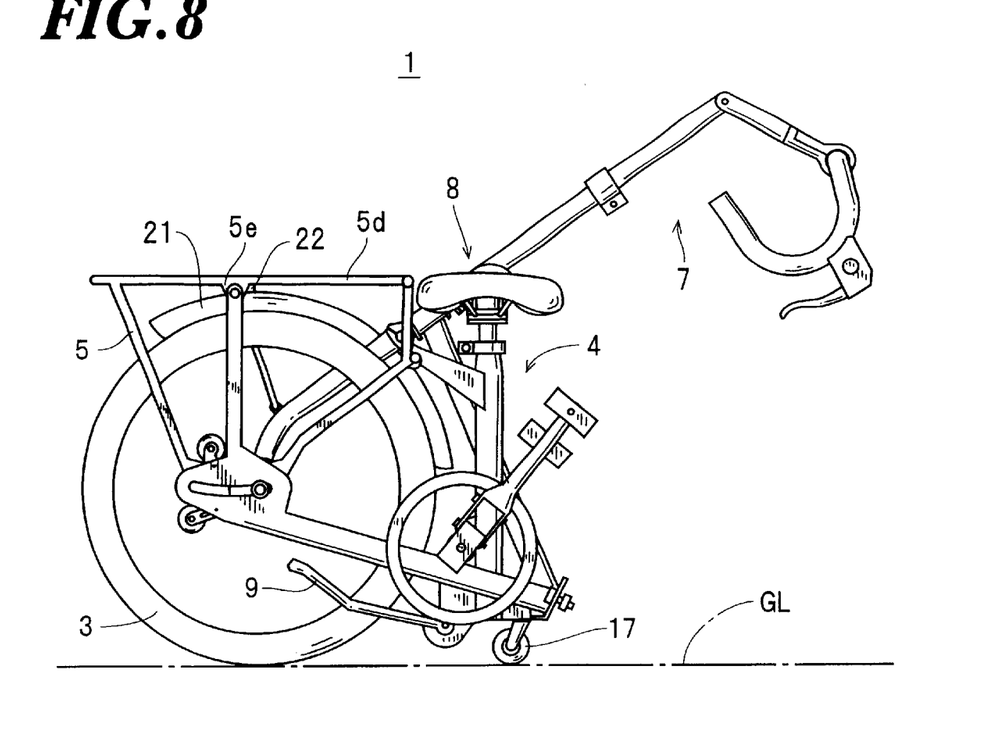
FIG. 8 is a side view showing an example of a folded state of the bicycle 1.
Figure 10:
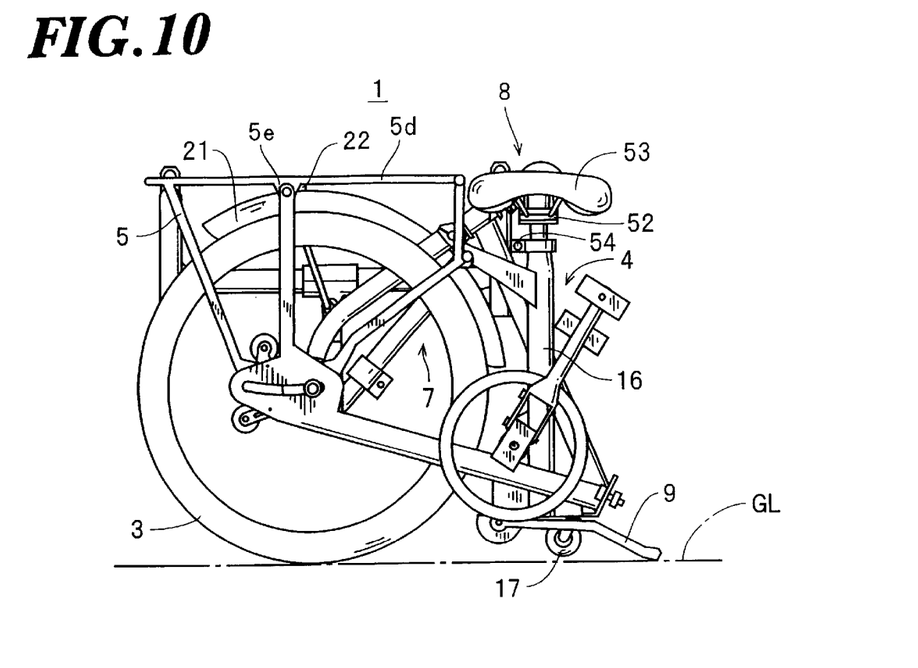
FIG. 10 is a side view showing another example of the folded state of the bicycle 1.

This bicycle 1 is capable of being placed in the extended state for running, as shown FIG. 1, in a first folded state for use as a cart, as shown in FIG. 8, or in a second folded state for storage, as shown in FIG. 10.

First, for running, each part or section of the folded bicycle 1 is extended, and then the kick stand 9 is kicked backward off the ground GL, whereby the front wheel 2 and the rear wheel 3 are brought into contact with the ground GL. In this state, since the axle 3a of the rear wheel 3 is positioned at the rear ends of the slits 24, there is maintained a sufficient distance between the two axles 2a, 3a, for ensuring the running stability of the bicycle 1.

Figure 7:
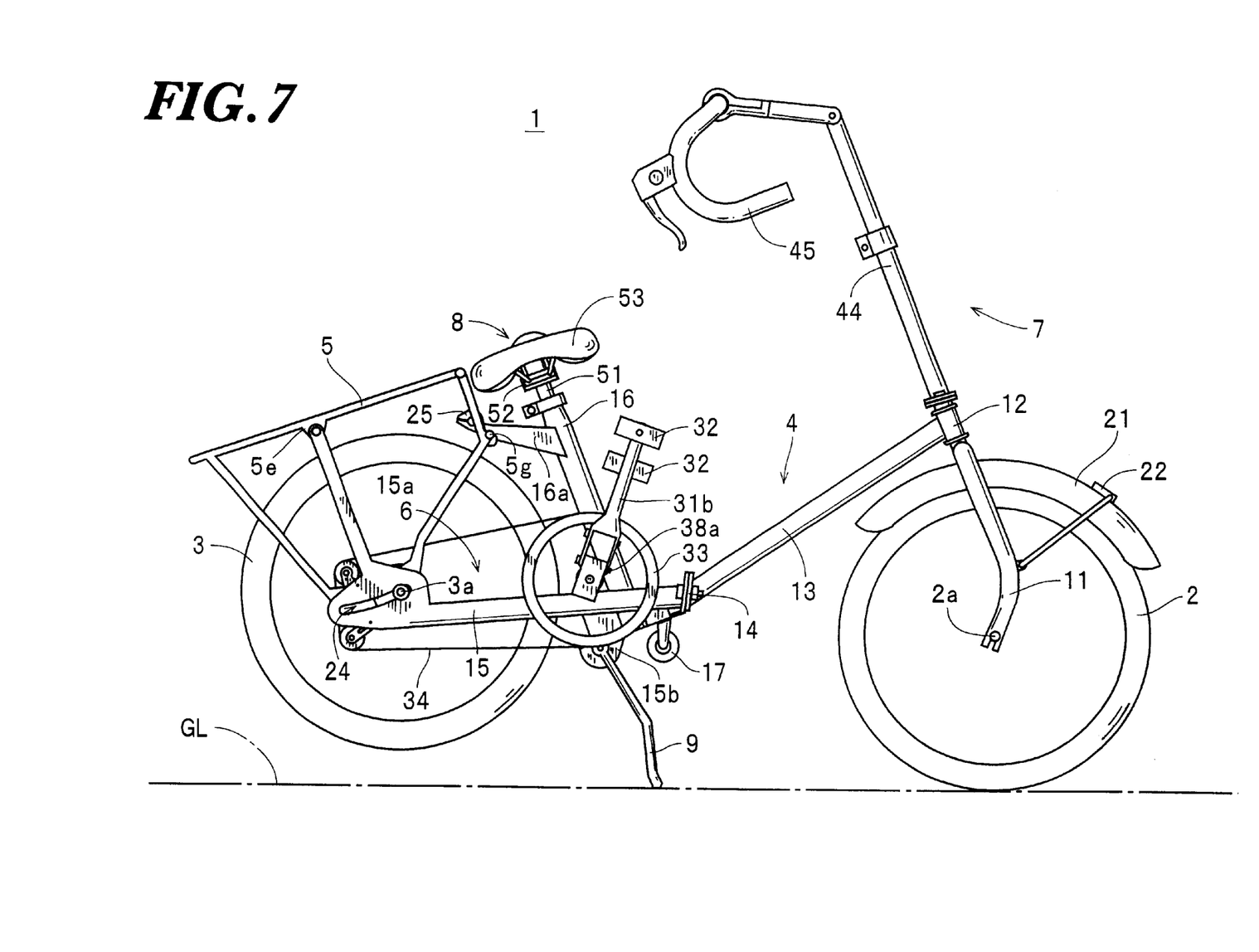
FIG. 7 is a side view of the bicycle 1 which has not yet been folded by a folding mechanism 14.

On the other hand, to fold the folding bicycle 1 into the first folded state for use as a cart, first, as shown in FIG. 7, the rack 5 is pivotally moved about the connecting portions 5e to shift the axle 3a to the front ends of the slits 24 and place the crossbar 5g in the state caught between the stay 16a and the metal hook 25. In this state, the distance between the axle 3a and the folding mechanism 14 is shorter than when the bicycle 1 is in its extended state. Further, the chain-holding mechanism 27 holds the sprocket chain 34 at the predetermined position to thereby release engagement between the rear wheel-side sprocket 35 and the sprocket chain 34, so that the drive mechanism 6 is inhibited from being driven for rotation with rotation of the rear wheel 3. Then, the seat section 8 is pushed into the seat tube 16 while rotating the seat section 8 until the seat post 51 is received in the seat tube 16. Next, the crank 31b is rotated about the fixing bolt 38a. At this time, the pedal 32 on the crank 31b which projected rightward as viewed from the rear of the bicycle 1 is caused to project leftward, i.e. in the direction in which the pedal 32 on the crank 31a projects. Then, the front wheel 2, the front fork 11, and the steering section 7 are all turned around. At this time, the distance between the axle 2a and the folding mechanism 14 is reduced by a distance which is twice as long as a front fork offset, compared with that in the extended state of the bicycle 1.

Figure 9:
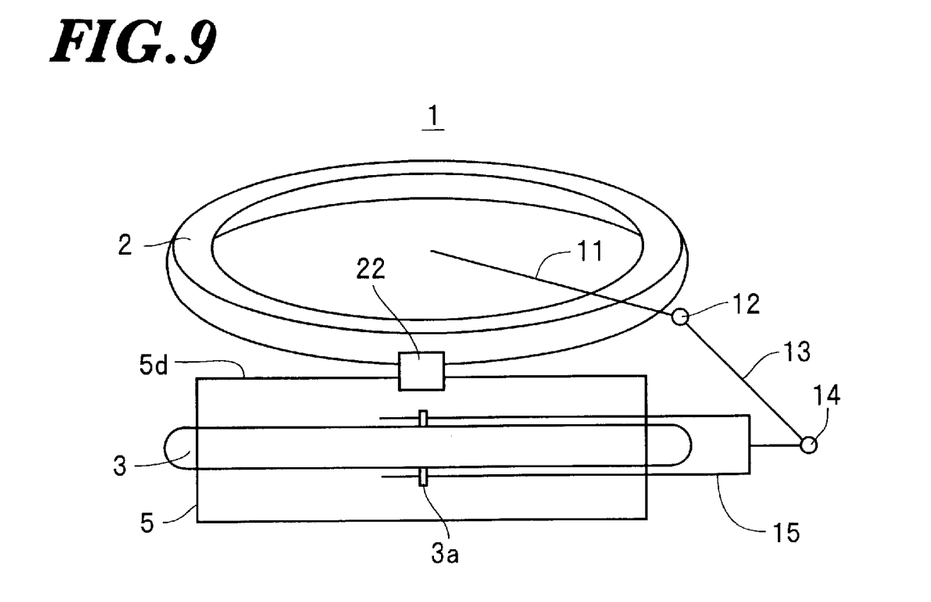
FIG. 9 is a conceptual representation of the bicycle 1 in the FIG. 8 state as viewed from above, which is useful in explaining positions of a front wheel 2 and the rear wheel 3.

In the process of folding the bicycle 1 completely, the bicycle 1 is folded by means of the folding mechanism 14, whereby the front wheel 2 is shifted to a position at the left side of the rear wheel 3 (only the rear wheel 3 is shown in FIG. 8). Further, the kick stand 9 is kicked toward the rear wheel 3 to thereby cause the auxiliary wheel 17 to place on the ground. Then, the carrier portion 5d of the rack 5 is caught by the locking mechanism 22 fixedly attached to the fender 21, whereby the front wheel 2 is fixed to the rear wheel 3. Thus, the bicycle 1 is placed in the first folded state. In this state, the bicycle 1 is supported by the front wheel 2, the rear wheel 3, and the auxiliary wheel 17, with the seat tube 16 disposed generally perpendicularly with respect to the ground GL and the carrier portion 5d of the rack 5 disposed generally horizontally with respect to the same. Therefore, the rack 5 is not inclined even in the folded state of the bicycle, so that it is possible to move the bicycle 1 with the baggage on the rack 5. Further, as shown in FIG. 9, the locking mechanism 22 holds the front wheel 2 such that the lines of intersection where the planes of rotation of the respective front and rear wheels 2, 3 intersect with the ground plane are substantially parallel to each other, and hence when the bicycle 1 in its folded state is moved straight, the rear wheel 3 and the front wheel 2 perform smooth rotation. Moreover, since the sprocket chain 34 disengaged from the rear wheel-side sprocket 35 is held by the chain-holding mechanism 27, the pedal 32 is inhibited from being rotated with rotation of the rear wheel 3, whereby contact or abutment between the pedal 32 and the frame 4 is prevented. As a result, differently from the bicycle 71 of the related art, the bicycle 1 can be easily moved without any need to be lifted.

Further, when the bicycle 1 is put away or stored, the upper post 42 is pushed into the undertube 41 of the steering section 7, and the upper part of the extension beam 43 (lower and upper metal retainers 43b, 43c) is rotated in the D direction as shown in FIG. 6B, and then the pipe 41c is folded by means of the folding mechanism 41b. As a result, the bicycle 1 is placed in the second folded state as shown in FIG. 10. Thereafter, when the kick stand 9 is kicked forward, the bicycle 1 is supported by the front and rear wheels 2, 3 and the kick stand 9, with the auxiliary wheel 17 slightly off the ground GL. In this state, the seat tube 16 is disposed generally perpendicularly with respect to the ground GL. Therefore, if the position of the saddle 53 is adjusted by the saddle angle-adjusting mechanism 52 such that the saddle 53 extends horizontal, it is possible to sit on the saddle 53, i.e. to use the bicycle 1 in its folded state as a chair. In this case, the height of the saddle 53 can be set as desired by a height-adjusting bolt 54 appearing in FIG. 10.

Figure 11:
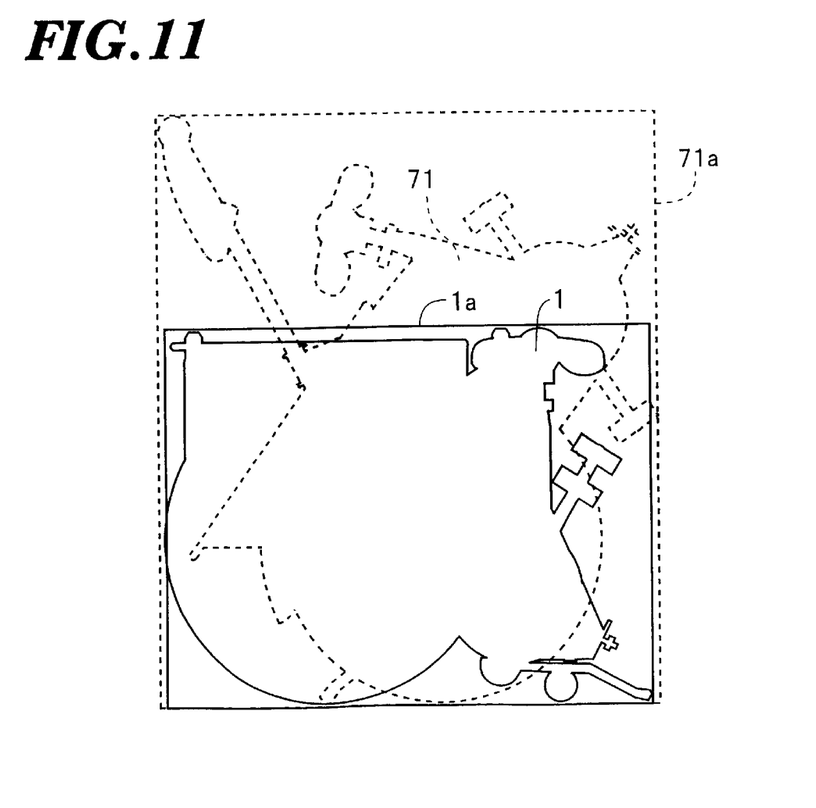
FIG. 11 is a view useful in explaining the size of the bicycle 1 in its folded state in comparison with that of a bicycle 71 in its folded state according to the related art.

As described above, the present invention makes it possible to reduce the size of bicycle 1 in its folded state while maintaining the running stability of the same in its extended state. As shown in FIG. 11, a space 1a occupied by the folded bicycle 1 is much smaller than a space 71a occupied by the folded bicycle 71, which is shown by dotted lines in the figure. Therefore, the bicycle 1 can be easily put away in a storeroom, a trunk of a vehicle or the like, and also easily carted about. Further, since the folded bicycle 1 can be used as a cart or a chair, so that when the user is traveling with the bicycle 1, he can easily carry baggage on the folded bicycle 1 or take a rest sitting on the same.

It should be noted that the present invention is not limited to the above embodiment, but the construction thereof can be modified as required. For example, although in the embodiment, the frame 4 does not have a top tube or a seat stay, the framework of the folding bicycle according to the invention is not limited to that shown in the embodiment. Further, although in the above embodiment, the sprocket chain 34 is held by the arms 28, 29, this is not limitative, but if a derailleur is connected to the rear wheel 3, it is possible to hold the sprocket chain 34 by means of the arm 28 and the derailleur by using the derailleur in place of the arm 29.

It is further understood by those skilled in the art that the foregoing is a preferred embodiment of the invention, and that various changes and modifications may be made without departing from the spirit and scope thereof.

What is claimed is:

1. A folding bicycle comprising a front wheel, a rear wheel having an axle, a rear wheel-side sprocket connected to said rear wheel, a sprocket chain for being engaged with said rear wheel-side sprocket, and a folding mechanism permitting the folding bicycle in an extended state to be folded at an intermediate region between said front wheel and said rear wheel, wherein the folding bicycle is folded by said folding mechanism such that said front wheel is brought to a position at one side of said rear wheel, the folding bicycle further comprising:

an axle shift mechanism permitting said axle of said rear wheel to be shifted to a position toward said intermediate region and to be held in said position toward said intermediate region; and a chain-holding mechanism that holds said sprocket chain at a predetermined position when said axle is shifted to and held in said position toward said intermediate region by said axle shift mechanism, to thereby release engagement between said rear wheel-side sprocket and said sprocket chain, and that disengages from said sprocket chain when said axle is shifted away from said position toward said intermediate region to permit engagement between said rear wheel-side sprocket and said sprocket chain.

2. A folding bicycle according to claim 1, including a front wheel-securing mechanism that rotatably secures said front wheel in a folded state of the folding bicycle, such that lines of intersection where a plane of rotation of said front wheel defined as an imaginary geometrical plane which contains a diameter of said front wheel and to which a rotational axis of said front wheel is perpendicular, and a plane of rotation of said rear wheel defined as an imaginary geometrical plane which contains a diameter of said rear wheel and to which a rotational axis of said rear wheel is perpendicular intersect with a ground plane defined as an imaginary geometrical plane corresponding to an arbitrary surface on which said front wheel and said rear wheel are supported are substantially parallel to each other.

3. A folding bicycle according to claim 1, including an auxiliary wheel arranged adjacent to said folding mechanism such that said auxiliary wheel can be placed on a ground together with said front wheel and said rear wheel in said folded state of the folding bicycle body, a rack arranged above said rear wheel, and a rack retainer mechanism that holds said rack generally horizontal with respect to a ground plane on which said front and rear wheels are placed, both in said extended sate and in a folded state of the folding bicycle.

4. A folding bicycle according to claim 2, including an auxiliary wheel arranged adjacent to said folding mechanism such that said auxiliary wheel can be placed on a ground together with said front wheel and said rear wheel in said folded state of the folding bicycle body, a rack arranged above said rear wheel, and a rack retainer mechanism that holds said rack generally horizontal with respect to a ground plane on which said front and rear wheels are placed, both in said extended state and in a folded state of the folding bicycle.

5. A folding bicycle according to claim 1, including a kick stand arranged adjacent to said folding mechanism such that said kick stand can support the folding bicycle in a folded state thereof when said kick stand is in a predetermined position, and a seat post, and wherein when said front wheel, said rear wheel, and said kick stand are placed on a ground in said folded state of the folding bicycle, said seat post is generally perpendicular to a plane of said ground.

6. A folding bicycle according to claim 2, including a kick stand arranged adjacent to said folding mechanism such that said kick stand can support the folding bicycle in a folded state thereof when said kick stand is in a predetermined position, and a seat post, and wherein when said front wheel, said rear wheel, and said kick stand are placed on a ground in said folded state of the folding bicycle, said seat post is generally perpendicular to a plane of said ground.

7. A folding bicycle according to claim 3, including a kick stand arranged adjacent to said folding mechanism such that said kick stand can support the folding bicycle in a folded state thereof when said kick stand is in a predetermined position, and a seat post, and wherein when said front wheel, said rear wheel, and said kick stand are placed on a ground in said folded state of the folding bicycle, said seat post is generally perpendicular to a plane of said ground.

8. A folding bicycle according to claim 4, including a kick stand arranged adjacent to said folding mechanism such that said kick stand can support the folding bicycle in a folded state thereof when said kick stand is in a predetermined position, and a seat post, and wherein when said front wheel, said rear wheel, and said kick stand are placed on a ground in said folded state of the folding bicycle, said seat post is generally perpendicular to a plane of said ground.

9. A folding bicycle according to claim 1, including a pair of pedals, a pair of pedal cranks connected to said pedals, respectively, one of said pair of pedals projecting from a corresponding one of said pair of pedal cranks in a direction away from said one side of said rear wheel in a folded state of the folding bicycle, and a crank-turning mechanism that permits said one of said pair of pedal cranks to be turned in a manner such that said one of said pair of pedals projects toward said one side of said rear wheel.

10. A folding bicycle according to claim 2, including a pair of pedals, a pair of pedal cranks connected to said pedals, respectively, one of said pair of pedals projecting from a corresponding one of said pair of pedal cranks in a direction away from said one side of said rear wheel in a folded state of the folding bicycle, and a crank-turning mechanism that permits said one of said pair of pedal cranks to be turned in a manner such that said one of said pair of pedals projects toward said one side of said rear wheel.

11. A folding bicycle according to claim 3, including a pair of pedals, a pair of pedal cranks connected to said pedals, respectively, one of said pair of pedals projecting from a corresponding one of said pair of pedal cranks in a direction away from said one side of said rear wheel in a folded state of the folding bicycle, and a crank-turning mechanism that permits said one of said pair of pedal cranks to be turned in a manner such that said one of said pair of pedals projects toward said one side of said rear wheel.

12. A folding bicycle according to claim 4, including a pair of pedals, a pair of pedal cranks connected to said pedals, respectively, one of said pair of pedals projecting from a corresponding one of said pair of pedal cranks in a direction away from said one side of said rear wheel in a folded state of the folding bicycle, and a crank-turning mechanism that permits said one of said pair of pedal cranks to be turned in a manner such that said one of said pair of pedals projects toward said one side of said rear wheel.

13. A folding bicycle according to claim 5, including a pair of pedals, a pair of pedal cranks connected to said pedals, respectively, one of said pair of pedals projecting from a corresponding one of said pair of pedal cranks in a direction away from said one side of said rear wheel in a folded state of the folding bicycle, and a crank-turning mechanism that permits said one of said pair of pedal cranks to be turned in a manner such that said one of said pair of pedals projects toward said one side of said rear wheel.

14. A folding bicycle according to claim 1, including a handle system having a telescopic column portion, and an extended portion connected to an upper end of said column portion such that said extended portion can be fixed at a desired stem angle and that said extended portion can be rotated about an axis extending in a direction of extension of said extended portion.

15. A folding bicycle according to claim 2, including a handle system having a telescopic column portion, and an extended portion connected to an upper end of said column portion such that said extended portion can be fixed at a desired stem angle and that said extended portion can be rotated about an axis extending in a direction of extension of said extended portion.

16. A folding bicycle according to claim 3, including a handle system having a telescopic column portion, and an extended portion connected to an upper end of said column portion such that said extended portion can be fixed at a desired stem angle and that said extended portion can be rotated about an axis extending in a direction of extension of said extended portion.

17. A folding bicycle according to claim 4, including a handle system having a telescopic column portion, and an extended portion connected to an upper end of said column portion such that said extended portion can be fixed at a desired stem angle and that said extended portion can be rotated about an axis extending in a direction of extension of said extended portion.

18. A folding bicycle according to claim 5, including a handle system having a telescopic column portion, and an extended portion connected to an upper end of said column portion such that said extended portion can be fixed at a desired stem angle and that said extended portion can be rotated about an axis extending in a direction of extension of said extended portion.

19. A folding bicycle according to claim 9, including a handle system having a telescopic column portion, and an extended portion connected to an upper end of said column portion such that said extended portion can be fixed at a desired stem angle and that said extended portion can be rotated about an axis extending in a direction of extension of said extended portion.

20. The folding bicycle according to claim 1,
wherein said axle shift mechanism comprises a rear arm and a slit formed in said rear arm, wherein said axle of said rear wheel is positioned in said slit such that said axle of said rear wheel may be shifted to said position toward said intermediate region along said slit and said axle of said rear wheel may be held in said position toward said intermediate region at an end of said slit; and
said chain-holding mechanism comprises:
a plate;

an arm pivotally connected on a first end thereof to said plate, said arm comprising a groove that receives a pin positioned on said rear arm; and a pulley rotatably connected to a second end of said arm, wherein when said axle is in a position away from said intermediate region, said sprocket chain engages said rear wheel-side sprocket and said pulley is disengaged from said sprocket chain, and when said axle is shifted along said slit in said rear arm, said arm pivots on said plate guided by said pin in said groove to said position toward said intermediate region so that said sprocket is disengaged from said sprocket chain and said pulleys are engaged with said sprocket chain.

* * * * *